(12) United States Patent
Robin

(10) Patent No.: US 8,821,749 B2
(45) Date of Patent: *Sep. 2, 2014

(54) AZEOTROPE-LIKE COMPOSITIONS OF E-1,1,1,4,4,4-HEXAFLUORO-2-BUTENE AND 1-CHLORO-3,3,3-TRIFLUOROPROPENE

(75) Inventor: Mark L. Robin, Middletown, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 325 days.

This patent is subject to a terminal disclaimer.

(21) Appl. No.: 13/090,495

(22) Filed: Apr. 20, 2011

(65) Prior Publication Data

US 2011/0260093 A1    Oct. 27, 2011

Related U.S. Application Data

(60) Provisional application No. 61/327,746, filed on Apr. 26, 2010, provisional application No. 61/329,294, filed on Apr. 29, 2010, provisional application No. 61/435,875, filed on Jan. 25, 2011.

(51) Int. Cl.
| | |
|---|---|
| *C09K 5/04* | (2006.01) |
| *C08J 9/14* | (2006.01) |
| *C11D 7/50* | (2006.01) |
| *C09K 3/30* | (2006.01) |
| *A62D 1/02* | (2006.01) |
| *A62D 1/00* | (2006.01) |
| *C08J 9/06* | (2006.01) |

(52) U.S. Cl.
CPC *C08J 9/149* (2013.01); *C08J 9/146* (2013.01); *C11D 7/5054* (2013.01); *A62D 1/0057* (2013.01); *C08J 9/144* (2013.01); *C09K 3/30* (2013.01); *C09K 2205/122* (2013.01); *C09K 2205/126* (2013.01); *A62D 1/0071* (2013.01); *C09K 5/045* (2013.01)
USPC ............ 252/67; 252/8; 252/78.1; 252/364; 521/50

(58) Field of Classification Search
USPC ...................... 252/8, 67, 364, 78.1
See application file for complete search history.

(56) References Cited

U.S. PATENT DOCUMENTS

| | | |
|---|---|---|
| 3,085,918 A | 4/1963 | Sherliker et al. |
| 3,723,318 A | 3/1973 | Butler |
| 3,884,828 A | 5/1975 | Butler |
| 4,085,073 A | 4/1978 | Suh et al. |
| 4,394,491 A | 7/1983 | Hoffman |
| 4,613,708 A | 9/1986 | Riess et al. |
| 4,704,410 A | 11/1987 | Booth et al. |
| 4,704,411 A | 11/1987 | Gansow et al. |
| 5,037,572 A | 8/1991 | Merchant |
| 5,164,419 A | 11/1992 | Bartlett et al. |
| 5,204,159 A | 4/1993 | Tan et al. |
| 5,332,761 A | 7/1994 | Paquet et al. |
| 5,463,150 A | 10/1995 | Lui et al. |
| 5,777,184 A | 7/1998 | Van Der Puy et al. |
| 5,900,185 A | 5/1999 | Tapscott |
| 5,908,822 A | 6/1999 | Dishart |
| 5,977,271 A | 11/1999 | McKay et al. |
| 6,071,580 A | 6/2000 | Bland et al. |
| 6,590,005 B2 | 7/2003 | Singh et al. |
| 6,610,250 B1 | 8/2003 | Tuma |
| 6,703,431 B2 | 3/2004 | Dietzen et al. |
| 6,787,580 B2 | 9/2004 | Chonde et al. |
| 2004/0119047 A1 | 6/2004 | Singh et al. |
| 2004/0256594 A1 | 12/2004 | Singh et al. |
| 2005/0233934 A1 | 10/2005 | Singh et al. |
| 2007/0077488 A1 | 4/2007 | Chen et al. |
| 2007/0096051 A1 | 5/2007 | Nappa et al. |
| 2007/0098646 A1 | 5/2007 | Nappa et al. |
| 2007/0100009 A1 | 5/2007 | Creazzo et al. |
| 2007/0100010 A1 | 5/2007 | Creazzo et al. |
| 2007/0105738 A1 | 5/2007 | Nappa et al. |
| 2007/0108403 A1 | 5/2007 | Sievert et al. |
| 2007/0203046 A1 | 8/2007 | Minor et al. |
| 2008/0269532 A1 | 10/2008 | Swearingen |
| 2010/0172701 A1* | 7/2010 | Tucker et al. .............. 405/284 |

(Continued)

FOREIGN PATENT DOCUMENTS

| | | |
|---|---|---|
| DE | 253431 | 2/1976 |
| EP | 0398147 B1 | 9/1994 |
| EP | 0731162 A1 | 11/1996 |
| EP | 0350316 B1 | 2/1997 |
| GB | 950876 | 2/1964 |
| WO | 9423008 A1 | 10/1994 |
| WO | 2004/037913 A2 | 5/2004 |
| WO | 2005/099718 A1 | 10/2005 |
| WO | 2006/101882 A2 | 9/2006 |
| WO | WO 2008121783 A1 * | 10/2008 |

(Continued)

OTHER PUBLICATIONS

International Search Report, Mail Date July 26, 2011, PCT/US2011/033843.

(Continued)

*Primary Examiner* — Peter F Godenschwager

(57) ABSTRACT

Azeotropic or azeotrope-like compositions are disclosed. The azeotropic or azeotrope-like compositions are mixtures of E-1,1,1,4,4,4-hexafluoro-2-butene with E-1-chloro-3,3,3-trifluoropropene or 2-chloro-3,3,3-trifluoropropene. Also disclosed is a process of preparing a thermoplastic or thermoset foam by using such azeotropic or azeotrope-like compositions as blowing agents. Also disclosed is a process of producing refrigeration by using such azeotropic or azeotrope-like compositions. Also disclosed is a process of using such azeotropic or azeotrope-like compositions as solvents. Also disclosed is a process of producing an aerosol product by using such azeotropic or azeotrope-like compositions. Also disclosed is a process of using such azeotropic or azeotrope-like compositions as heat transfer media. Also disclosed is a process of extinguishing or suppressing a fire by using such azeotropic or azeotrope-like compositions. Also disclosed is a process of using such azeotropic or azeotrope-like compositions as dielectrics.

9 Claims, 2 Drawing Sheets

(56) References Cited

U.S. PATENT DOCUMENTS

| | | |
|---|---|---|
| 2010/0210747 A1 | 8/2010 | Loh et al. |
| 2010/0216904 A1 | 8/2010 | Loh et al. |
| 2011/0004035 A1 | 1/2011 | Merkel et al. |
| 2011/0124756 A1 | 5/2011 | Singh et al. |
| 2011/0124757 A1 | 5/2011 | Singh et al. |
| 2011/0144216 A1 | 6/2011 | Hulse et al. |

FOREIGN PATENT DOCUMENTS

| | | |
|---|---|---|
| WO | 2008/154612 A1 | 12/2008 |
| WO | WO 2008154612 A1 * | 12/2008 |
| WO | 2009/014965 A1 | 1/2009 |
| WO | 2009/014966 A1 | 1/2009 |
| WO | 2009/032983 A1 | 3/2009 |
| WO | 2009/073487 A1 | 6/2009 |
| WO | 2009/085857 A1 | 7/2009 |
| WO | 2009085857 A2 | 7/2009 |
| WO | 2009114397 A2 | 9/2009 |
| WO | 2009155490 A1 | 12/2009 |
| WO | 2010062888 A2 | 6/2010 |
| WO | 2010141527 A1 | 12/2010 |

OTHER PUBLICATIONS

H. Boden et. al., Chapter 4, Polyurethane Handbook, Edited by G. Certel, Hanser Publishers, NY 1985.

H. Grunbauer et. al., "Fine Celled CFC-Free Rigid Roam—New Machinery With Low Boiling Blowing Agents", Published in Polyurethanes 92 From the Proceeding of the SPI 34th Annual Technical/Marketing Conference, Oct. 21-24, 1992, New Orleans, Louisiana.

M. Taverna et. al., "Soluble or Insoluble Alternative Blowing Agents? Processing Technologies for Both Alternatives, Presented by Equipment Manufacturer", Published in Polyurethanes World Congress 1991 From the Processing of the SPI/SOPA Sep. 24-26, 1991, Acropolis, Nice, France.

Santini G. et. al., "The Reaction of Perfluoroalkylcopper Compounds With 1-Bromo-Perfluoroalkyethylenes", Tetrahedron, vol. 29, 1973, pp. 2411-2414, XP002427778, Table 3; Compound 2A, 2B.

Devallezbernard et. al., "Solubility of Respiratory Gases in the 1, 2-Bis(F-Alkyl) Ethenes", Journal De Chimie Physique, Societe De Chimie Physique, Paris, France, vol. 85, No. 10, 1988, pp. 947-952, XP008077143.

Gao et al, "Dip-Coating of Ultra Think Liquid Lubricant and Its Control for Thin-Film Magnetic Hard Disks", IEEE Transactions on Magnetics, vol. 31, No. 6, 1995, pp. 2982-2984.

Le Blanc M et. al., "A Strategy for the Synthesis of Pure, Inert Perfluoroalkylated Derivatives Designed for Flood Substitution", Oxygen Carrying C9olloidal Blood Substituess, Iinternational Symposium Perfluorochem Blood Substitutes, 1982, pp. 43-49, XP008077176.

F. Jeanneaux et. al., "Additional Thermique Des IODO-1-Perfluoroalcanes Sur Les Perfluoroalkylethylenes", Journal of Fluorine Chemistry, 4 (1974), pp. 261-270.

World Meteorological Organization Global Ozone Research and Monitoring Project, Scientific Assessment of Ozone Depletion: 2002, "Source Gases", Report No. 47, Published Mar. 2003, pp. 1.28-1.31.

Kochdopole, R. E. et. al., "Polystyrene Foams", Encyclopedia of Polymer Science, vol. 16 (1989), p. 193-206.

Pedler A. E. et. al., "The Synthesis and Dehydroflurination of Some Polyfluoroalkanes", J. Fluorine Chem.; vol. 1 No. 3, 1972, pp. 337-345, XP002427764.

M. F. Doherty and M.F. Malone, Conceptual Design of Distillation Systems, McGraw-Hill (New York), 2001, 185-186, 351-359).

"Phase Equilibrium in Process Design", Wiley-Interscience Publisher, 1970, written by Haroid R. Null, on pp. 124 to 126.

"The Properties of Gases and Liquids," 4th edition, published by McGraw Hill, written by Reid, Prausnitz and Poling, on pp. 241 to 387.

"Phase Equilibria in Chemical Engineering," published by Butterworth Publishers, 1985, written by Stanley M. Walas, pp. 165 to 244.

* cited by examiner

US 8,821,749 B2

AZEOTROPE-LIKE COMPOSITIONS OF E-1,1,1,4,4,4-HEXAFLUORO-2-BUTENE AND 1-CHLORO-3,3,3-TRIFLUOROPENE

This application claims priority of U.S. Patent Application 61/327,746 filed Apr. 26, 2010, and U.S. Patent Application 61/435,875 filed Jan. 25, 2011.

BACKGROUND OF THE INVENTION

1. Field of the Disclosure

The present disclosure relates to azeotropic or azeotrope-like compositions of E-1,1,1,4,4,4-hexafluoro-2-butene.

2. Description of Related Art

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs).

The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future. Thus, there is a need for compositions that do not contribute to the destruction of stratospheric ozone and also have low global warming potentials (GWPs). Certain hydrofluoroolefins, such as 1,1,1,4,4,4-hexafluoro-2-butene ($CF_3CH$=$CHCF_3$, FC-1336mzz, FO-1336mzz), are believed to meet both goals.

SUMMARY OF THE INVENTION

This application includes two different types of azeotropic or azeotrope-like mixtures.

This disclosure provides a composition consisting essentially of (a) E-FO-1336mzz and (b) E-HCFO-1233zd (E-1-chloro-3,3,3-trifluoropropene, E-$CF_3CH$=$CHCl$); wherein the E-HCFO-1233zd is present in an effective amount to form an azeotrope-like mixture with E-FO-1336mzz.

This disclosure also provides a composition consisting essentially of (a) E-FO-1336mzz and (b) HCFO-1233xf (2-chloro-3,3,3-trifluoropropene, $CF_3CCl$=$CH_2$); wherein the HCFO-1233xf is present in an effective amount to form an azeotropic or azeotrope-like mixture with E-FO-1336mzz.

DETAILED DESCRIPTION OF THE INVENTION

Figure 1:
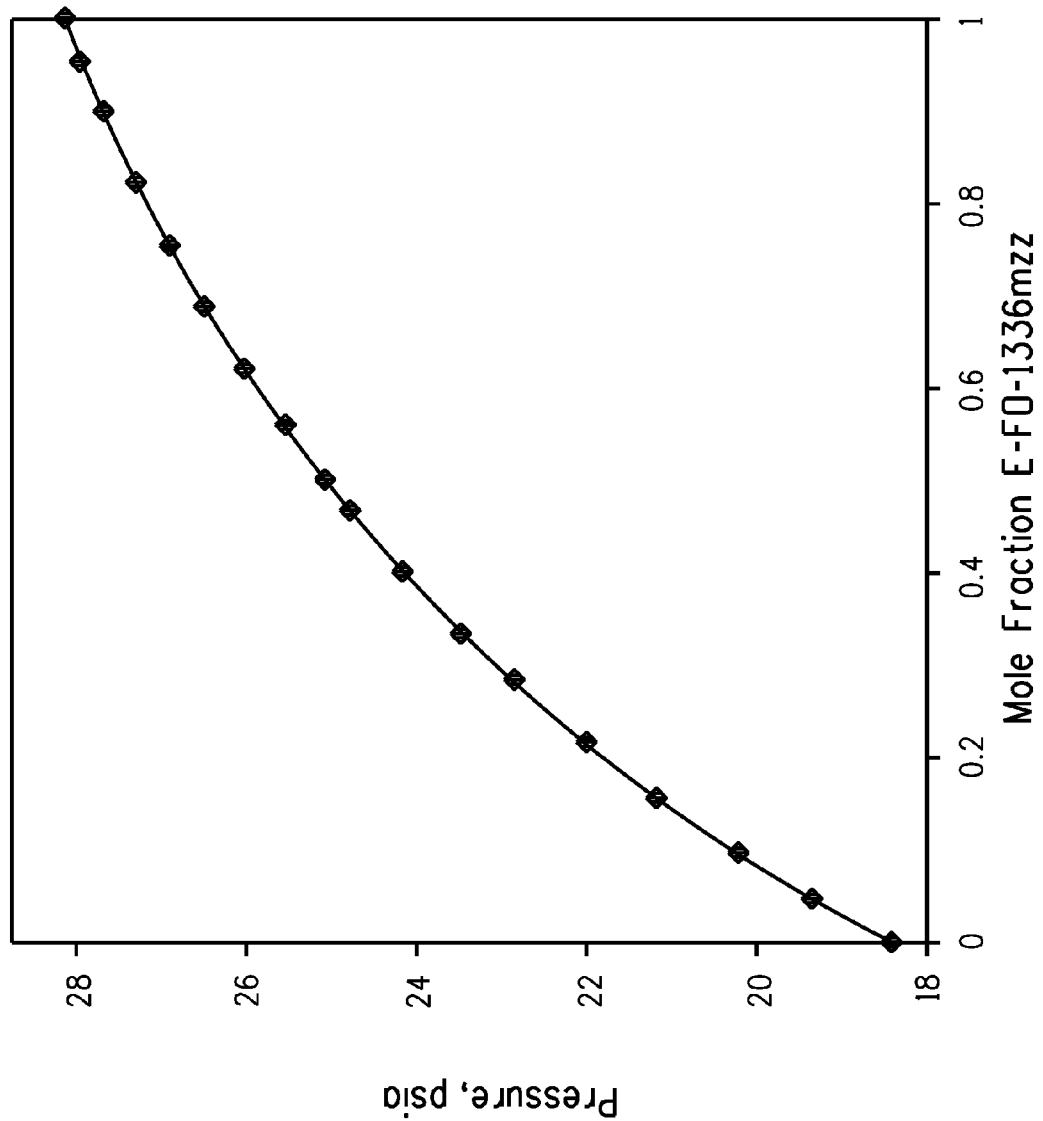
FIG. 1 is a graphical representation of azeotrope-like compositions consisting essentially of E-FO-1336mzz and E-HCFO-1233zd at a temperature of about 24.7° C.

In many applications, the use of a pure single component or an azeotropic or azeotrope-like mixture is desirable. For example, when a blowing agent composition (also known as foam expansion agents or foam expansion compositions) is not a pure single component or an azeotropic or azeotrope-like mixture, the composition may change during its application in the foam forming process. Such change in composition could detrimentally affect processing or cause poor performance in the application. Also, in refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure single component or an azeotropic or azeotrope-like composition, the refrigerant composition may change when leaked or discharged to the atmosphere from the refrigeration equipment. The change in refrigerant composition may cause the refrigerant to become flammable or to have poor refrigeration performance. Accordingly, there is a need for using azeotropic or azeotrope-like mixtures in these and other applications, for example azeotropic or azeotrope-like mixtures containing E-1,1,1,4,4,4-hexafluoro-2-butene (E-$CF_3CH$=$CHCF_3$, E-FC-1336mzz, E-FO-1336mzz).

Before addressing details of embodiments described below, some terms are defined or clarified.

FO-1336mzz may exist as one of two configurational isomers, E or Z. FO-1336mzz as used herein refers to the isomers, Z-FO-1336mzz or E-FO-1336mzz, as well as any combinations or mixtures of such isomers.

HCFO-1233zd (1-chloro-3,3,3-trifluoropropene, $CF_3CH$=$CHCl$) may exist as one of two configurational isomers, E or Z. HCFO-1233zd as used herein refers to the isomers, Z-HCFO-1233zd or E-HCFO-1233zd, as well as any combinations or mixtures of such isomers.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

E-FO-1336mzz is a known compound, and can be made by the reaction of 1,2-dichloro-1,1,4,4,4-pentafluorobutane with dried KF in distilled tetramethylene sulphone, which is disclosed in U.S. Pat. No. 5,463,150.

E-HCFO-1233zd is a known compound and can be made by the fluorination of $CCl_3CH_2CHCl_2$ with HF in the presence of $SnCl_4$, such as disclosed by Van Der Puy et al. in U.S. Pat. No. 5,777,184.

HCFO-1233xf is a known compound and can be made by the addition of HF to $CH_2ClCCl=CCl_2$ in a gas phase reaction using di-isopropyl amine as a stabilizer and $Cr_2O_3$ as a catalyst, such as disclosed by Merkel et al. in US Patent Application Publication Number 2011/0004035.

This application includes azeotropic or azeotrope-like compositions comprising E-FO-1336mzz.

In some embodiments of this invention, the composition consists essentially of (a) E-FO-1336mzz and (b) E-HCFO-1233zd; wherein the E-HCFO-1233zd is present in an effective amount to form an azeotrope-like mixture with E-FO-1336mzz.

In some embodiments of this invention, the composition consists essentially of (a) E-FO-1336mzz and (b) HCFO-1233xf; wherein the HCFO-1233xf is present in an effective amount to form an azeotropic or azeotrope-like mixture with E-FO-1336mzz.

By effective amount is meant an amount, which, when combined with E-FO-1336mzz, results in the formation of an azeotropic or azeotrope-like mixture. This definition includes the amounts of each component, which amounts may vary depending on the pressure applied to the composition so long as the azeotropic or azeotrope-like compositions continue to exist at the different pressures, but with possible different boiling points. Therefore, effective amount includes the amounts, such as may be expressed in weight or mole percentages, of each component of the compositions of the instant invention which form azeotropic or azeotrope-like compositions at temperatures or pressures other than as described herein.

As recognized in the art, an azeotropic composition is an admixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit dew point pressure and bubble point pressure with virtually no pressure differential. That is to say that the difference in the dew point pressure and bubble point pressure at a given temperature will be a small value. In this invention, compositions with a difference in dew point pressure and bubble point pressure of less than or equal to 5 percent (based upon the bubble point pressure) is considered to be azeotrope-like.

It is recognized in this field that when the relative volatility of a system approaches 1.0, the system is defined as forming an azeotropic or azeotrope-like composition. Relative volatility is the ratio of the volatility of component 1 to the volatility of component 2. The ratio of the mole fraction of a component in vapor to that in liquid is the volatility of the component.

To determine the relative volatility of any two compounds, a method known as the PTx method can be used. The vapor-liquid equilibrium (VLE), and hence relative volatility, can be determined either isothermally or isobarically. The isothermal method requires measurement of the total pressure of mixtures of known composition at constant temperature. In this procedure, the total absolute pressure in a cell of known volume is measured at a constant temperature for various compositions of the two compounds. The isobaric method requires measurement of the temperature of mixtures of known composition at constant pressure. In this procedure, the temperature in a cell of known volume is measured at a constant pressure for various compositions of the two compounds. Use of the PTx Method is described in detail in "Phase Equilibrium in Process Design", Wiley-Interscience Publisher, 1970, written by Harold R. Null, on pages 124 to 126.

These measurements can be converted into equilibrium vapor and liquid compositions in the PTx cell by using an activity coefficient equation model, such as the Non-Random, Two-Liquid (NRTL) equation, to represent liquid phase non-idealities. Use of an activity coefficient equation, such as the NRTL equation is described in detail in "The Properties of Gases and Liquids," 4th edition, published by McGraw Hill, written by Reid, Prausnitz and Poling, on pages 241 to 387, and in "Phase Equilibria in Chemical Engineering," published by Butterworth Publishers, 1985, written by Stanley M. Walas, pages 165 to 244. Without wishing to be bound by any theory or explanation, it is believed that the NRTL equation, together with the PTx cell data, can sufficiently predict the relative volatilities of the E-1,1,1,4,4,4-hexafluoro-2-butene-containing compositions of the present invention and can therefore predict the behavior of these mixtures in multistage separation equipment such as distillation columns.

It was found through experiments that E-FO-1336mzz and E-HCFO-1233zd form azeotrope-like compositions.

To determine the relative volatility of this binary pair, the PTx method described above was used. The pressure in a PTx cell of known volume was measured at constant temperature for various binary compositions. These measurements were then reduced to equilibrium vapor and liquid compositions in the cell using the NRTL equation.

The vapor pressure measured versus the compositions in the PTx cell for E-FO-1336mzz/E-HCFO-1233zd mixture is shown in FIG. 1, which illustrates graphically the formation of azeotrope-like compositions consisting essentially of E-1, 1,1,4,4,4-hexafluoro-2-butene and E-HCFO-1233zd at 24.7° C., as indicated by mixtures of about 1 to about 19 mole % E-1,1,1,4,4,4-hexafluoro-2-butene and about 99 to about 81 mole % E-HCFO-1233zd, and by mixtures of about 38 to about 99 mole % E-1,1,1,4,4,4-hexafluoro-2-butene and about 62 to about 1 mole % E-HCFO-1233zd.

According to calculation, azeotrope-like compositions consisting essentially of from about 1 to about 99 mole percent E-FO-1336mzz and from about 99 to about 1 mole percent E-HCFO-1233zd are formed at temperatures ranging from about −40° C. to about 140° C. (i.e., over this temperature range, the difference in dew point pressure and bubble point pressure of the composition at a particular temperature is less than or equal to 5 percent (based upon the bubble point pressure)).

Some embodiments of azeotrope-like compositions are listed in Table 1. Additional embodiments of azeotrope-like compositions are listed in Table 2.

TABLE 1

Azeotrope-like Compositions

| COMPONENTS | T (° C.) | Mole % Range |
|---|---|---|
| E-FO-1336mzz/E-HCFO-1233zd | −40 | 1-5/99-95 and 67-99/33-1 |
| E-FO-1336mzz/E-HCFO-1233zd | −20 | 1-8/99-92 and 56-99/44-1 |
| E-FO-1336mzz/E-HCFO-1233zd | 0 | 1-12/99-88 and 47-99/53-1 |
| E-FO-1336mzz/E-HCFO-1233zd | 20 | 1-17/99-83 and 40-99/60-1 |
| E-FO-1336mzz/E-HCFO-1233zd | 40 | 1-99/99-1 |
| E-FO-1336mzz/E-HCFO-1233zd | 50 | 1-99/99-1 |
| E-FO-1336mzz/E-HCFO-1233zd | 60 | 1-99/99-1 |
| E-FO-1336mzz/E-HCFO-1233zd | 80 | 1-99/99-1 |
| E-FO-1336mzz/E-HCFO-1233zd | 100 | 1-99/99-1 |
| E-FO-1336mzz/E-HCFO-1233zd | 120 | 1-99/99-1 |
| E-FO-1336mzz/E-HCFO-1233zd | 140 | 1-99/99-1 |

TABLE 2

Azeotrope-like Compositions

| COMPONENTS | T (° C.) | Mole % Range |
|---|---|---|
| E-FO-1336mzz/E-HCFO-1233zd | −40 | 67-95/33-5 |
| E-FO-1336mzz/E-HCFO-1233zd | −20 | 5-8/95-92 and 56-95/44-5 |
| E-FO-1336mzz/E-HCFO-1233zd | 0 | 5-12/95-88 and 47-95/53-5 |
| E-FO-1336mzz/E-HCFO-1233zd | 20 | 5-17/95-83 and 40-95/60-5 |
| E-FO-1336mzz/E-HCFO-1233zd | 40 | 5-95/95-5 |
| E-FO-1336mzz/E-HCFO-1233zd | 50 | 5-95/95-5 |
| E-FO-1336mzz/E-HCFO-1233zd | 60 | 5-95/95-5 |
| E-FO-1336mzz/E-HCFO-1233zd | 80 | 5-95/95-5 |
| E-FO-1336mzz/E-HCFO-1233zd | 100 | 5-95/95-5 |
| E-FO-1336mzz/E-HCFO-1233zd | 120 | 5-95/95-5 |
| E-FO-1336mzz/E-HCFO-1233zd | 140 | 5-95/95-5 |

It was found through experiments that E-FO-1336mzz and HCFO-1233xf form azeotropic or azeotrope-like compositions. To determine the relative volatility of this binary pair, the PTx method described above was used. The pressure in a PTx cell of known volume was measured at constant temperature for various binary compositions. These measurements were then reduced to equilibrium vapor and liquid compositions in the cell using the NRTL equation.

Figure 2:
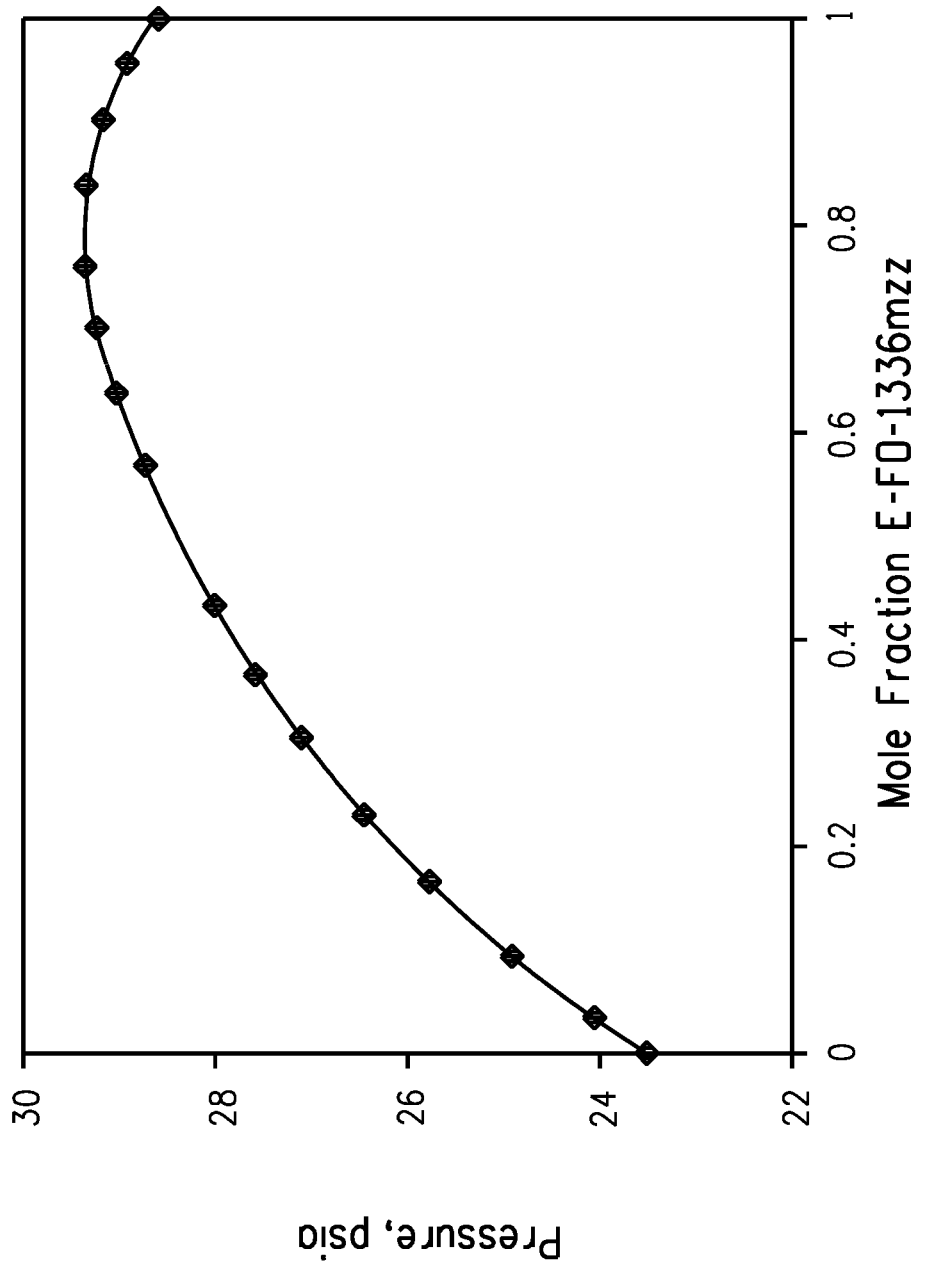
FIG. 2 is a graphical representation of an azeotropic composition consisting essentially of E-FO-1336mzz and HCFO-1233xf at a temperature of about 25.7° C.

The vapor pressure measured versus the compositions in the PTx cell for E-FO-1336mzz/HCFO-1233xf mixture is shown in FIG. 2, which illustrates graphically the formation of an azeotropic composition consisting essentially of E-FO-1336mzz and HCFO-1233xf as indicated by a mixture of about 81.6 mole % E-FO-1336mzz and 18.4 mole % HCFO-1233xf having the highest pressure over the range of compositions at about 25.7° C.

Based upon these findings, it has been calculated that E-FO-1336mzz and HCFO-1233xf form azeotropic compositions ranging from about 60.2 mole percent to about 98.8 mole percent E-FO-1336mzz and from about 39.8 mole percent to about 1.2 mole percent HCFO-1233xf (which form azeotropic compositions boiling at a temperature of from about −40° C. to about 120° C. and at a pressure of from about 1.5 psia (10 kPa) to about 328 psia (2261 kPa)). For example, at about 25.7° C. and about 29.4 psia (203 kPa) the azeotropic composition consists essentially of about 81.6 mole % E-FO-1336mzz and about 18.4 mole % HCFO-1233xf. For another example, at about 7.0° C. and about atmospheric pressure (14.7 psia, 101 kPa) the azeotropic composition consists essentially of about 76.3 mole % E-FO-1336mzz and about 23.7 mole % HCFO-1233xf. Some embodiments of azeotropic compositions are listed in Table 3.

TABLE 3

Azeotropic compositions

| Azeotropic Temperature (° C.) | Azeotropic Pressure (psia) | E-FO-1336mzz (mole %) | HCFO-1233xf (mole %) |
|---|---|---|---|
| −40.0 | 1.46 | 60.2 | 39.8 |
| −30.0 | 2.60 | 64.1 | 35.9 |
| −20.0 | 4.40 | 67.7 | 32.3 |
| −10.0 | 7.11 | 71.1 | 28.9 |
| 0.0 | 11.0 | 74.2 | 25.8 |
| 10.0 | 16.5 | 77.2 | 22.8 |
| 20.0 | 24.0 | 80.0 | 20.0 |
| 25.7 | 29.4 | 81.6 | 18.4 |
| 30.0 | 33.9 | 82.7 | 17.3 |
| 40.0 | 46.7 | 85.2 | 14.8 |
| 50.0 | 63.0 | 87.7 | 12.3 |
| 60.0 | 83.3 | 90.1 | 9.9 |
| 70.0 | 108 | 92.3 | 7.7 |
| 80.0 | 138 | 94.5 | 5.5 |
| 90.0 | 175 | 96.4 | 3.6 |
| 100.0 | 218 | 97.9 | 2.1 |
| 110.0 | 268 | 98.8 | 1.2 |
| 120.0 | 328 | 98.2 | 1.8 |

Additionally, azeotrope-like compositions containing E-FO-1336mzz and HCFO-1233xf may also be formed. According to calculation, azeotrope-like compositions consisting essentially of from about 1 to about 99 mole percent E-FO-1336mzz and from about 99 to about 1 mole percent HCFO-1233xf are formed at temperatures ranging from about −40° C. to about 120° C. (i.e., over this temperature range, the difference in dew point pressure and bubble point pressure of the composition at a particular temperature is less than or equal to 5 percent (based upon the bubble point pressure)).

Such azeotrope-like compositions exist around azeotropic compositions. Some embodiments of azeotrope-like compositions are listed in Table 4. Some more embodiments of azeotrope-like compositions are listed in Table 5.

TABLE 4

Azeotrope-like Compositions

| COMPONENTS | T (° C.) | Mole Percentage Range |
| --- | --- | --- |
| E-FO-1336mzz/HCFO-1233xf | −40 | 1-99/99-1 |
| E-FO-1336mzz/HCFO-1233xf | −20 | 1-99/99-1 |
| E-FO-1336mzz/HCFO-1233xf | 0 | 1-99/99-1 |
| E-FO-1336mzz/HCFO-1233xf | 40 | 1-99/99-1 |
| E-FO-1336mzz/HCFO-1233xf | 80 | 1-99/99-1 |
| E-FO-1336mzz/HCFO-1233xf | 120 | 1-99/99-1 |

TABLE 5

Azeotrope-like Compositions

| COMPONENTS | T (° C.) | Mole Percentage Range |
| --- | --- | --- |
| E-FO-1336mzz/HCFO-1233xf | −40 | 5-95/95-5 |
| E-FO-1336mzz/HCFO-1233xf | −20 | 5-95/95-5 |
| E-FO-1336mzz/HCFO-1233xf | 0 | 5-95/95-5 |
| E-FO-1336mzz/HCFO-1233xf | 40 | 5-95/95-5 |
| E-FO-1336mzz/HCFO-1233xf | 80 | 5-95/95-5 |
| E-FO-1336mzz/HCFO-1233xf | 120 | 5-95/95-5 |

The azeotropic or azeotrope-like compositions of the present invention can be prepared by any convenient method including mixing or combining the desired amounts. In one embodiment of this invention, an azeotropic or azeotrope-like composition can be prepared by weighing the desired component amounts and thereafter combining them in an appropriate container.

The azeotropic or azeotrope-like compositions of the present invention can be used in a wide range of applications, including their use as aerosol propellants, refrigerants, solvents, cleaning agents, blowing agents (foam expansion agents) for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents.

One embodiment of this invention provides a process for preparing a thermoplastic or thermoset foam. The process comprises using an azeotropic or azeotrope-like composition as a blowing agent, wherein said azeotropic or azeotrope-like composition consists essentially of E-1,1,1,4,4,4-hexafluoro-2-butene and a component selected from the group consisting of E-HCFO-1233zd and HCFO-1233xf.

Another embodiment of this invention provides a process for producing refrigeration. The process comprises condensing an azeotropic or azeotrope-like composition and thereafter evaporating said azeotropic or azeotrope-like composition in the vicinity of the body to be cooled, wherein said azeotropic or azeotrope-like composition consists essentially of E-1,1,1,4,4,4-hexafluoro-2-butene and a component selected from the group consisting of E-HCFO-1233zd and HCFO-1233xf.

Another embodiment of this invention provides a process using an azeotropic or azeotrope-like composition as a solvent, wherein said azeotropic or azeotrope-like composition consists essentially of E-1,1,1,4,4,4-hexafluoro-2-butene and a component selected from the group consisting of E-HCFO-1233zd and HCFO-1233xf.

Another embodiment of this invention provides a process for producing an aerosol product. The process comprises using an azeotropic or azeotrope-like composition as a propellant, wherein said azeotropic or azeotrope-like composition consists essentially of E-1,1,1,4,4,4-hexafluoro-2-butene and a component selected from the group consisting of E-HCFO-1233zd and HCFO-1233xf.

Another embodiment of this invention provides a process using an azeotropic or azeotrope-like composition as a heat transfer media, wherein said azeotropic or azeotrope-like composition consists essentially of E-1,1,1,4,4,4-hexafluoro-2-butene and a component selected from the group consisting of E-HCFO-1233zd and HCFO-1233xf.

Another embodiment of this invention provides a process for extinguishing or suppressing a fire. The process comprises using an azeotropic or azeotrope-like composition as a fire extinguishing or suppression agent, wherein said azeotropic or azeotrope-like composition consists essentially of E-1,1,1,4,4,4-hexafluoro-2-butene and a component selected from the group consisting of E-HCFO-1233zd and HCFO-1233xf.

Another embodiment of this invention provides a process using an azeotropic or azeotrope-like composition as dielectrics, wherein said azeotropic or azeotrope-like composition consists essentially of E-1,1,1,4,4,4-hexafluoro-2-butene and a component selected from the group consisting of E-HCFO-1233zd and HCFO-1233xf.

The invention claimed is:

1. A composition consisting essentially of:
    (a) E-1,1,1,4,4,4-hexafluoro-2-butene; and
    (b) a component selected from the group consisting of E-1-chloro-3,3,3-trifluoropropene and 2-chloro-3,3,3-trifluoropropene; wherein said component is present in an effective amount to form an azeotrope-like combination with the E-1,1,1,4,4,4-hexafluoro-2-butene.

2. The azeotrope-like composition of claim 1 consisting essentially of from about 1 to about 99 mole percent E-1,1,1,4,4,4-hexafluoro-2-butene and from about 99 to about 1 mole percent E-1-chloro-3,3,3-trifluoropropene, characterized by: at a temperature of from about −40° C. to about 140° C., said composition having a difference in dew point pressure and bubble point pressure of less than or equal to 5 percent based upon the bubble point pressure.

3. The azeotrope-like composition of claim 1 consisting essentially of from about 5 to about 99 mole percent E-1,1,1,4,4,4-hexafluoro-2-butene and from about 99 to about 5 mole percent E-1-chloro-3,3,3-trifluoropropene, characterized by: at a temperature of from about −40° C. to about 140° C., said composition having a difference in dew point pressure and bubble point pressure of less than or equal to 5 percent based upon the bubble point pressure.

4. The azeotrope-like composition of claim 1 consisting essentially of from about 1 to about 99 mole percent E-1,1,1,4,4,4-hexafluoro-2-butene and from about 99 to about 1 mole percent 2-chloro-3,3,3-trifluoropropene, characterized by: at a temperature of from about −40° C. to about 120° C., said composition having a difference in dew point pressure and bubble point pressure of less than or equal to 5 percent based upon the bubble point pressure.

5. The azeotrope-like composition of claim 1 consisting essentially of from about 5 to about 99 mole percent E-1,1,1,4,4,4-hexafluoro-2-butene and from about 99 to about 5 mole percent 2-chloro-3,3,3-trifluoropropene, characterized by: at a temperature of from about −40° C. to about 120° C., said composition having a difference in dew point pressure and bubble point pressure of less than or equal to 5 percent based upon the bubble point pressure.

6. A process for producing refrigeration comprising condensing the azeotrope-like composition of claim 1 and thereafter evaporating said azeotrope-like composition in the vicinity of the body to be cooled.

7. A composition consisting essentially of:
(a) E-1,1,1,4,4,4-hexafluoro-2-butene; and
(b) 2-chloro-3,3,3-trifluoropropene; wherein the 2-chloro-3,3,3-trifluoropropene is present in an effective amount to form an azeotropic combination with the E-1,1,1,4,4,4-hexafluoro-2-butene.

8. The azeotropic composition of claim 7 consisting essentially of from about 60.2 mole percent to about 98.8 mole percent E-1,1,1,4,4,4-hexafluoro-2-butene and from about 39.8 mole percent to about 1.2 mole percent 2-chloro-3,3,3-trifluoropropene, which has boiling point temperature of from about −40° C. to about 120° C. at a pressure of from about 1.5 psia to about 328 psia.

9. A process for producing refrigeration comprising condensing the azeotropic composition of claim 7 and thereafter evaporating said azeotropic composition in the vicinity of the body to be cooled.

* * * * *